Jan. 31, 1967 D. ATLAS 3,302,200
STORM TOPOGRAPHY MAPPING BY RADAR IDENTIFICATION OF TOTAL
STORM CONTOUR IN THREE DIMENSIONS
Filed July 20, 1964 4 Sheets-Sheet 1

INVENTOR.
DAVID ATLAS
BY
ATTORNEYS

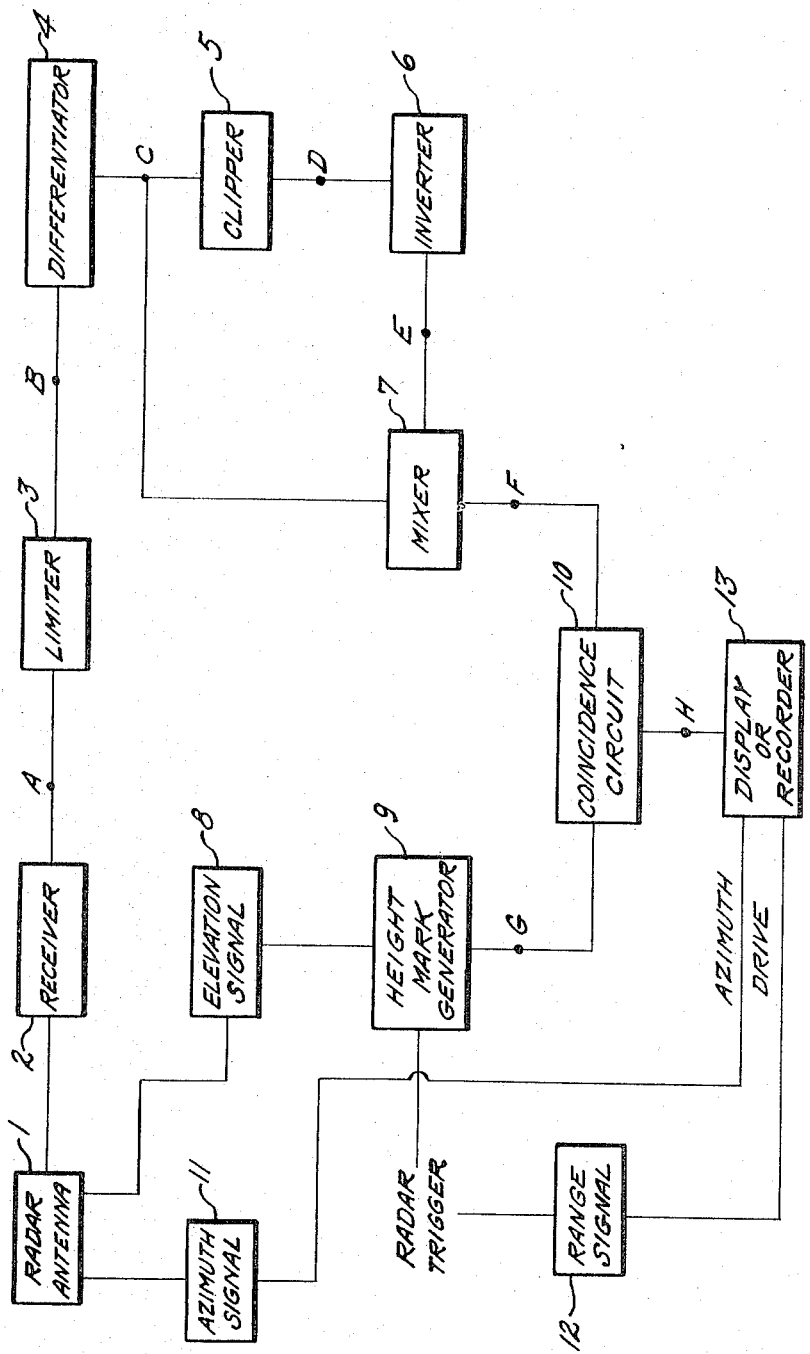

INVENTOR.
DAVID ATLAS

INVENTOR.
DAVID ATLAS

United States Patent Office 3,302,200
Patented Jan. 31, 1967

3,302,200
STORM TOPOGRAPHY MAPPING BY RADAR IDENTIFICATION OF TOTAL STORM CONTOUR IN THREE DIMENSIONS
David Atlas, Newton, Mass.
(828 Chestnut St., Waban, Mass. 02168)
Filed July 20, 1964, Ser. No. 384,005
10 Claims. (Cl. 343—7.9)

The invention described herein may be manufactured and used by or for the United States Government for governmental purposes without payment to me of any royalty thereon.

This invention relates to the identification of storms, and particularly to the identification of both the azimuthal and vertical extent of storms in a manner that permits incorporation of the identifying data into a single radar-generated display map.

In many applications of radar to storm analysis and aircraft control, it is necessary to have an overall view of the heights of storm tops and bases. For example, in severe storm identification and forecasting, the height of a storm is a measure of its severity. Also, in radar aircraft control, it is necessary that the controller (human or automatic) have an up-to-date reading of the position and height of the storms so that the aircraft (or other vehicles) may be guided safely through them.

Unfortunately, present techniques do not allow for sufficiently rapid measurement of the storm topography (bases and tops) to keep up with the speed of development of violent storm systems. Nor do present day techniques provide a simple display depicting such topography everywhere within the radar coverage. The usual method involves taking vertical cross-sections at various azimuths/and displaying them on the conventional Range Height Indicator scope. In this method, the human observer must piece together the various vertical cross-sections in his mind's eye in order to keep track of all storms in the hemisphere of sky under surveillance. Still another method involves the use of the CAPPI (Constant Altitude PPI) concept in which a series of electronic gates are positioned in conjunction with a beam elevation program to display the echoes at a series of constant altitudes in space, each constant level picture being recorded on a separate PPI display. Again the requirement for integration of all the displays into one overall picture in the observer's mind, and the need for multiple displays, is highly restrictive both from a feasibility and economic point of view.

The present invention overcomes all these objections: it presents a complete 3-dimensional picture of storm top and base topography in the form of isopleths of height on a single plan display. The contours are discretely coded in either thickness, time and position, or color, or a combination thereof in order to provide unambiguous height identification. The speed of operation is limited only by the antenna scanning rate, so that typically, the entire storm topography can be displayed in a matter of 2 to 3 minutes. This is sufficient to keep track of practically all storm systems.

In the drawings:

FIGURE 2 is a block diagram of the circuitry employed in practicing the invention;

FIG. 3 A–H show the pulse patterns obtained as the mapping progresses; and

Figure 4:
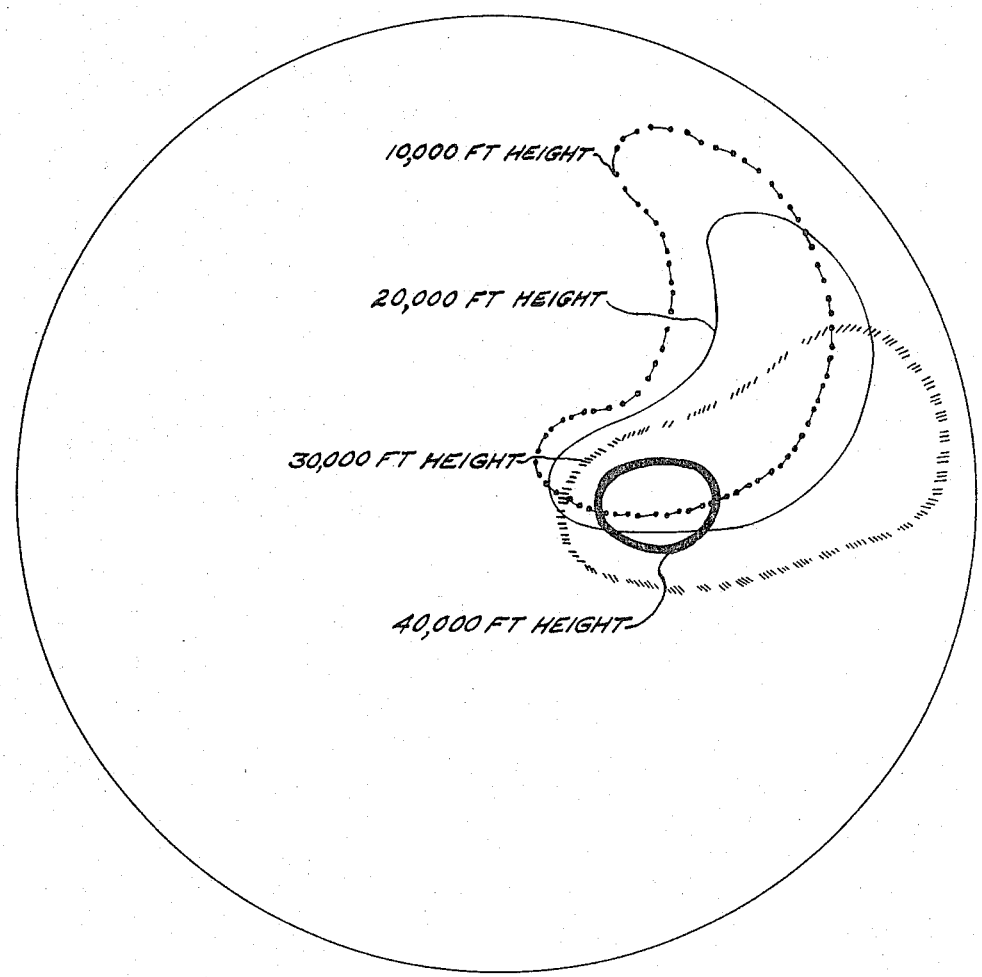

FIG. 4 shows the nature of the presentation on display 13 of FIG. 2 when display 13 is a P.P.I. scope.

Figure 1:
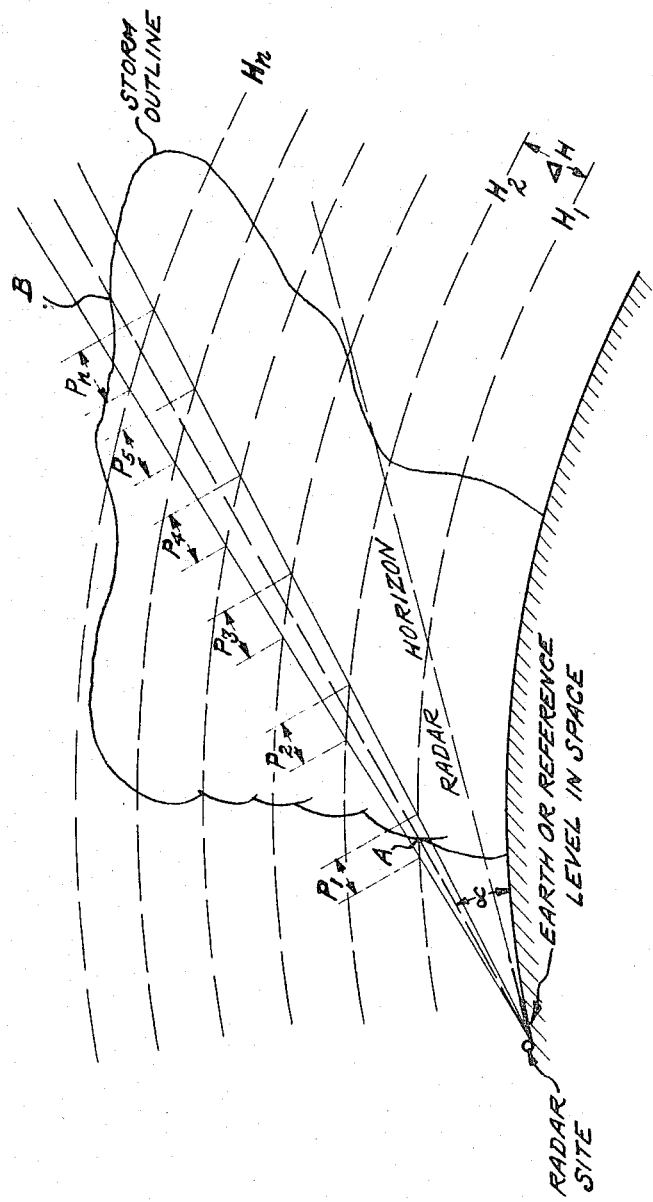
FIGURE 1 is a vertical cross-sectional view through a storm at a particular azimuthal angle, and showing points at which a radar beam intersects (a) the storm boundaries, and (b) circular lines representing increments of height above the earth's surface.
Figure 3A:
Figure 3B:
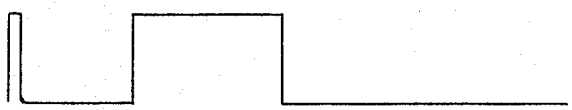
Figure 3C:
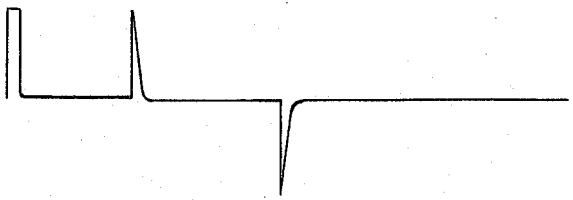
Figure 3D:
Figure 3E:
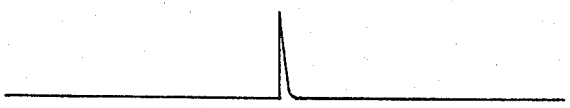
Figure 3F:
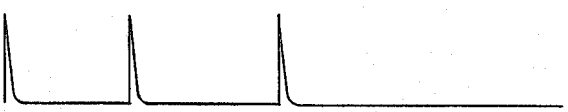
Figure 3G:
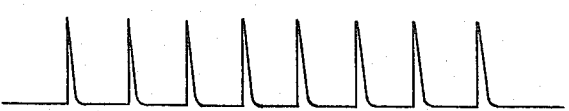
Figure 3H:
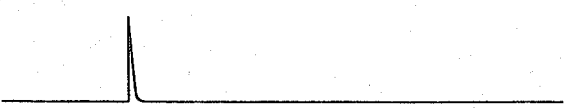

The basic concept of the system is illustrated in FIGS. 1 and 2 which are intended to describe the principles and are not restricted to the specific means there shown for its accomplishment. FIG. 1 represents a vertical cross-section through an idealized storm along a particular azimuth showing the curved earth's surface (or a corresponding surface in space if the radar is elevated as in an aircraft), and the surfaces $H_1$, $H_2$ ... $H_n$, spaced $\Delta H$ apart for which it is desired to obtain height contours. Electronic pulses corresponding to the true heights $H_1$, $H_2$ ... $H_n$ may be readily generated using standard circuitry for the generation of electronic height markers as is done, for example, in the AN/FPS-6 radar. In addition, the video signal corresponding to the ranges from which echoes are received from the storm may be readily operated upon to produce pulses at the boundaries such as A and B. The video boundary pulses and the height marker pulses may then be applied to a coincidence circuit which passes the video boundary pulse only if it occurs at one of the prescribed heights $H_1$ through $H_n$. The output of the coincidence circuit then goes to some standard plan display. Since the scanning time for the entire volume of sky may be of the order of a few minutes, the display must have a storage capability or be recorded photographically. Obviously, the scanning may be accomplished in either the vertical direction with successive displacement by a beamwidth in azimuth until the important volume of sky is covered, or in azimuth along constant beam elevation with successive displacement of the beam in elevation.

FIG. 2 represents an illustrative block diagram with corresponding signal wave forms as shown in FIG. 3 A–H. The video output FIGURE 3 A of the receiver 2 is strongly limited by limiter 3 to provide rectangular wave form of FIGURE 3 B with sharp rise and fall at the echo boundaries. Differentiator 4 produces pulses such as shown in FIGURE 3 C corresponding to the echo boundaries. The positive pulses are clipped by clipper 5 to produce the wave form as shown in FIGURE 3 D, and inverter 6 inverts it to the wave form as shown in FIGURE 3 E, which is combined with the leading edge pulse in positive pulse mixer 7 to produce two positive pulses as shown in FIGURE 3 F corresponding to the two boundaries of the storm echo. At the same time, the elevation signal 8 corresponding to the elevation angle of the beam, and the radar trigger drive the electronic height marker generator 9 which produces a series of pulses as shown in FIGURE 3 G corresponding to the true heights $H_1$, $H_2$ ... $H_n$, corrected for earth curvature. Pulses shown in FIGURE 3 F corresponding to the echo boundaries and the height mark pulses of FIGURE 3 G, are applied to a time coincidence circuit which passes a boundary pulse signal only when it is coincident with one of the $n$ height marker pulses. The output of the coincidence circuit is recorded on the display 13 at position coordinates corresponding to the azimuth signal 11 and range signal 12.

The display 13 may be a conventional PPI scope viewed by a camera whose shutter remains open during the time for the complete volume scan, or it may be any one of a number of rapid writing direct view storage devices. FIG. 4 illustrates the nature of the presentation on display 13 when display 13 is a conventional P.P.I. scope as aforementioned.

The height marker generator 9 is a conventional circuit such as the one employed in the AN/FPS–6 radar height finder which is shown in Air Force T.O. 31 P 3–2 FPS 6–2 entitled Handbook Of Operating And Maintenance Instructions For FPS–6 Radar. A representative height mark generator is also shown and described at pages 248 and 249 of Radiation Laboratory Series, volume 22, published by McGraw-Hill Book Co., Inc. in 1948. This system incorporates an automatic correction for the earth's curvature which is not shown in FIG. 2.

If the scanning is accomplished at successive elevation angles $X_1$, $X_2$, etc., rather than by a continuous vertical scan at successive azimuths, it may be necessary to broaden the height mark pulses so that their durations correspond to range intervals $P_1$, $P_2$, ... $P_n$ as indicated in FIG. 1. Obviously, the intervals $P_i$ correspond to the vertical beamwidth or, if less precision can be tolerated, to $\Delta\alpha$, the elevation angle interval between successive azimuth scans. This is necessary to be sure that any echo in the interval $P_i$, will be recorded without requiring that the echo occur precisely at a position corresponding to that at which the center of the beam crosses the altitude level $H_i$. In this case, the height marker generator 9 in FIG. 2 must take a form similar to that of the CAPPI range gate used in the CAPPI display system.

Since adjacent height marks (G in FIG. 2) are available at individual output taps, they may be readily coded in amplitude, duration, or modulated in a discrete azimuth position code for purposes of identification on the final display. Also, it is apparent that any single contour or combination of contours can be preselected for display.

There are obviously a variety of different means for accomplishing the same objective. For example, it is apparent that the storm boundary signals may be readily located within the height gates simply by physically (or electronically) masking the face of an RHI scope so that signals appear only within preselected height slits. The masked RHI scope may then be viewed by a photocell whose signal output may be amplified and applied to a PPI scope. Similarly, a physical or electronic mask may be used over the PPI scope and a photocell used to accept the light from the echo boundaries showing through the mask at successive elevation angles.

What I claim is:

1. The method of providing, on a two-dimensional map, a visual display of three-dimensional data representative of the height, width and depth of a storm, which method comprises the steps of radiating pulses of electromagnetic energy both in azimuth and elevation, receiving signals reflected from said storm, generating video boundary pulses of said storm from said received reflected signals, generating height marker pulses in predisposed relationship to the time of said radiated pulses, said height marker pulses representing the expected time of arrival of the reflected signals from preselected heights, and the further step of selecting for recording only those video boundary pulses that occur at one of the height levels corresponding to one of said height marker pulses.

2. A method of utilizing radar to provide three dimensional data representative of the height, width, and depth of a storm for presentation on a single visual display, which method comprises the steps of radar scanning said storm both in azimuth and elevation to obtain signals reflected therefrom, selecting only those reflected signals received from predetermined heights, and presenting said selected signals on a single display.

3. A radar system for providing three dimensional data representative of the height, width, and depth of a storm for presentation on a single visual display comprising means to radiate electromagnetic energy in form of pulses both in azimuth and elevation, means to receive signals reflected from said storm, means to generate video boundary pulses of said storm from said received reflected signals, means to generate height marker pulses in predisposed relationship to the time of arrival of said radiated pulses, said height marker pulses representing the expected time of arrival of the reflected signals from preselected heights, and means for selecting only those video boundary pulses that occur at one of height levels corresponding to one of said height marker pulses.

4. A radar system as described in claim 3 further including means for visually presenting said selected pulses on a single display.

5. A radar system as described in claim 3 wherein said selecting means includes a coincidence circuit receiving said height marker pulses and said video boundary pulses.

6. A radar system as defined in claim 3 wherein said means to generate height marker pulses for preselected heights is activated by a radar trigger signal to establish time references relative to said radiated pulses and also by an elevation signal to obtain height marker pulses whose position in time correspond to the expected times of arrival of reflected signals from said heights.

7. A radar system as defined in claim 3 wherein said means to generate video boundary pulses is comprised of means to limit said received reflected signals, means to differentiate said limited signals.

8. A radar system for providing three dimensional data representative of the height, width, and depth of a storm for presentation on a single visual display comprising means for radiating electromagnetic pulses both in azimuth and elevation, means to receive pulses reflected from said storm, means for selecting only those received reflected pulses from predetermined heights, and presenting said selected pulses on a single display.

9. A radar system as defined in claim 8 wherein said selecting means includes means to generate video boundary pulses of said storm from said received signals, means to generate height marker pulses, said marker pulse generating means receiving a radar trigger signal to establish a time reference relative to said radiated pulses and also an elevation signal to obtain height marker pulses whose position in time corresponds to the expected times of arrival of reflected pulses from said heights, and a coincidence circuit receiving both said video boundary pulses and height marker pulses.

10. A radar system for providing three dimensional data representative of the height, width, and depth of a storm comprising means to radiate radar pulses both in azimuth and elevation, means to receive pulses reflected from said storm, means to limit said received pulses, means to differentiate said limited pulses to provide video boundary pulses of said storm, one of said boundary pulses being positive and the other negative, means to convert said video boundary pulses into only positive pulses, means to generate height marker pulses for predetermined heights, said generating means being activated by a radar trigger signal to establish a time reference relative to said radiated pulses and also by an elevation signal to obtain height marker pulses whose position in time correspond to the expected times of arrival of reflected pulses from said heights, coincidence means receiving both said height marker pulses and said positive pulses representative of said boundaries of said storm, and a single visual display receiving the output from said coincidence means, said visual display also receiving a range signal and azimuth signal.

References Cited by the Examiner

UNITED STATES PATENTS

| | | | |
|---|---|---|---|
| 2,821,703 | 1/1958 | Knauss | 343—7.9 |
| 2,979,713 | 4/1961 | Fleming-Williams | 343—7.9 |
| 3,179,934 | 4/1965 | Buyer | 343—7.9 |

CHESTER L. JUSTUS, *Primary Examiner.*

P. M. HINDERSTEIN, R. D. BENNETT,
*Assistant Examiners.*